(12) United States Patent
de Heer

(10) Patent No.: US 7,987,482 B2
(45) Date of Patent: Jul. 26, 2011

(54) PROMOTED LISTINGS

(75) Inventor: David de Heer, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 10/989,083

(22) Filed: Nov. 15, 2004

(65) Prior Publication Data

US 2006/0107291 A1 May 18, 2006

(51) Int. Cl.
*G06F 13/00* (2006.01)
*G06F 3/00* (2006.01)
*H04N 5/445* (2011.01)

(52) U.S. Cl. .............. 725/44; 725/39; 725/43; 725/46
(58) Field of Classification Search .............. 725/32, 725/35, 48, 97, 39–46
See application file for complete search history.

(56) References Cited

U.S. PATENT DOCUMENTS

| | | | |
|---|---|---|---|
| 5,534,911 A | 7/1996 | Levitan | |
| 5,758,259 A | 5/1998 | Lawler | |
| 5,990,885 A | 11/1999 | Gopinath | |
| 7,328,450 B2 * | 2/2008 | Macrae et al. ............... | 725/42 |
| 2002/0035727 A1 * | 3/2002 | Numata et al. ............... | 725/44 |
| 2002/0112239 A1 * | 8/2002 | Goldman ...................... | 725/46 |
| 2002/0188635 A1 | 12/2002 | Larson | |
| 2003/0084446 A1 * | 5/2003 | Thurston et al. ............. | 725/44 |
| 2003/0163813 A1 * | 8/2003 | Klosterman et al. ......... | 725/42 |
| 2003/0200544 A1 * | 10/2003 | Ellis et al. .................... | 725/46 |
| 2004/0003413 A1 * | 1/2004 | Boston et al. ................ | 725/133 |
| 2004/0148628 A1 * | 7/2004 | Mears ........................... | 725/43 |
| 2004/0194131 A1 | 9/2004 | Ellis et al. | |
| 2005/0028201 A1 | 2/2005 | Klosterman et al. | |
| 2005/0125823 A1 | 6/2005 | McCoy et al. | |
| 2005/0149964 A1 | 7/2005 | Thomas et al. | |
| 2005/0216936 A1 | 9/2005 | Knudson et al. | |
| 2006/0053049 A1 | 3/2006 | Nolan | |
| 2006/0136965 A1 | 6/2006 | Ellis et al. | |
| 2006/0242665 A1 | 10/2006 | Knee et al. | |

OTHER PUBLICATIONS

Lafferty, Michael, "Taking the guided tour: electronic/interactive program guides playing a crucial role," vol. 28, No. 5, May 2002, pp. 64-67.

Rust, Roland T., "Viewer Preference Segmentation and Viewing Choice Models for Network Television," Journal of Advertising, vol. XXI, No. 1, Mar. 1992, pp. 1-18.

* cited by examiner

*Primary Examiner* — Christopher Kelley
*Assistant Examiner* — Mulugeta Mengesha
(74) *Attorney, Agent, or Firm* — Lee & Hayes, PLLC

(57) ABSTRACT

Promoted listings are defined in terms of priorities, which may be static, geographically dynamic, or demographically dynamic. The priorities are associated with program data that describes media programs that are scheduled for broadcast or other type of transmission. The program data and priorities are transmitted to client devices that are configured to generate a display of the program data based, at least in part, on the priorities.

33 Claims, 13 Drawing Sheets

Mickey and Friends

...plot description....
...rating....

Press Select to Tune to This Showing

| APRIL 19 | 1:00 PM | 1:30 PM | 2:00 PM | 2:30 PM | 3:00 PM | 3:30 PM |
|---|---|---|---|---|---|---|
| 37 FOX | <<Perry Mason | MLB – Houston at Atlanta | | | | |
| 22 ESPN | MLB – Seattle at Oakland | | | | | |
| 6 KHQ | Days of Our Lives | | Passions | | Rosie O'Donnel | |
| 42 DSNY | Mickey and Friends | | Beauty and the Beast | | | |
| 127 NICK | Rocko's Modern Life | The Angry Beavers | The Wild Thornberrys | Rocket Power | Spongebob Squarepants | The Fairly OddParents |
| 1 PPV | Shrek | | | Atlantis: The Lost Empire | | |
| 2 KREM | As the World Turns | | Guilding Light | | Ananda Lewis | |
| 3 KAYU | Texas Justice | Paid Programming | Paid Programming | Garfield | Magic Schoolbus | Sister, Sister |
| 4 KXLY | One Life to Live | | General Hospital | | Port Charles | Maury |
| 5 GOVACC | <<Government Access Programming>> | | | | | |
| 6 KHQ | Days of Our Lives | | Passions | | Rosie O'Donnel | |
| 7 KSPS | Terry Madden Watercolor | Kaye's Quilting Friends | Caillou | Sagwa, the Chinese Siamese Cat | Mister Rogers' Neighborhood | Arthur |
| 8 KGPX | Bonanza | | Bonanza | | Promised Land | |
| 9 TDC | Home Matters | | Christopher Lowell | | Christopher Lowell | |
| 10 HSN | Mother's Day Gifts | | Gem Source | | | |

*Figure 1*

PROMOTED LISTINGS

TECHNICAL FIELD

This invention relates to media entertainment systems and, in particular, to architectures that support promoted listings.

BACKGROUND

Many media entertainment systems, such as cable or satellite television networks, broadcast media content over hundreds of channels. Many of these entertainment systems provide electronic program guides (EPGs) that allow users to browse and in some instances, interactively select, programs in which they are interested. Most electronic program guides list the available channels linearly, ordered by channel number. With hundreds of channels available, finding a particular program of interest can be a daunting task.

To help television viewers easily find programs of interest, some EPGs may re-order the listings based on a frequency with which a viewer watches a particular channel. For example, in such an implementation, the channels that a viewer watches most often may appear first in the grid, and the remaining channels are listed next, in numerical order.

Companies that provide media content to subscribers (e.g., cable television companies, satellite television companies, etc.) are in business to generate revenue. Accordingly, a technique for displaying in an EPG, programs that are likely of interest to a viewer that also generates income for a company that provides media content to subscribers is desirable.

SUMMARY

Techniques for enabling promoted listings are described. Priorities are assigned to programs and/or channels that are to be promoted. The priorities may be network-wide, or may be dynamic, based on geographic regions or demographic attributes. An electronic program guide (EPG) is generated to display EPG data such that data associated with the promoted channels and/or programs is displayed based on the priorities.

BRIEF DESCRIPTION OF THE DRAWINGS

The same numbers are used throughout the drawings to reference like features and components.

FIG. 1 is an exemplary screen display of an electronic program guide that includes promoted listings.

DETAILED DESCRIPTION

Figure 2:
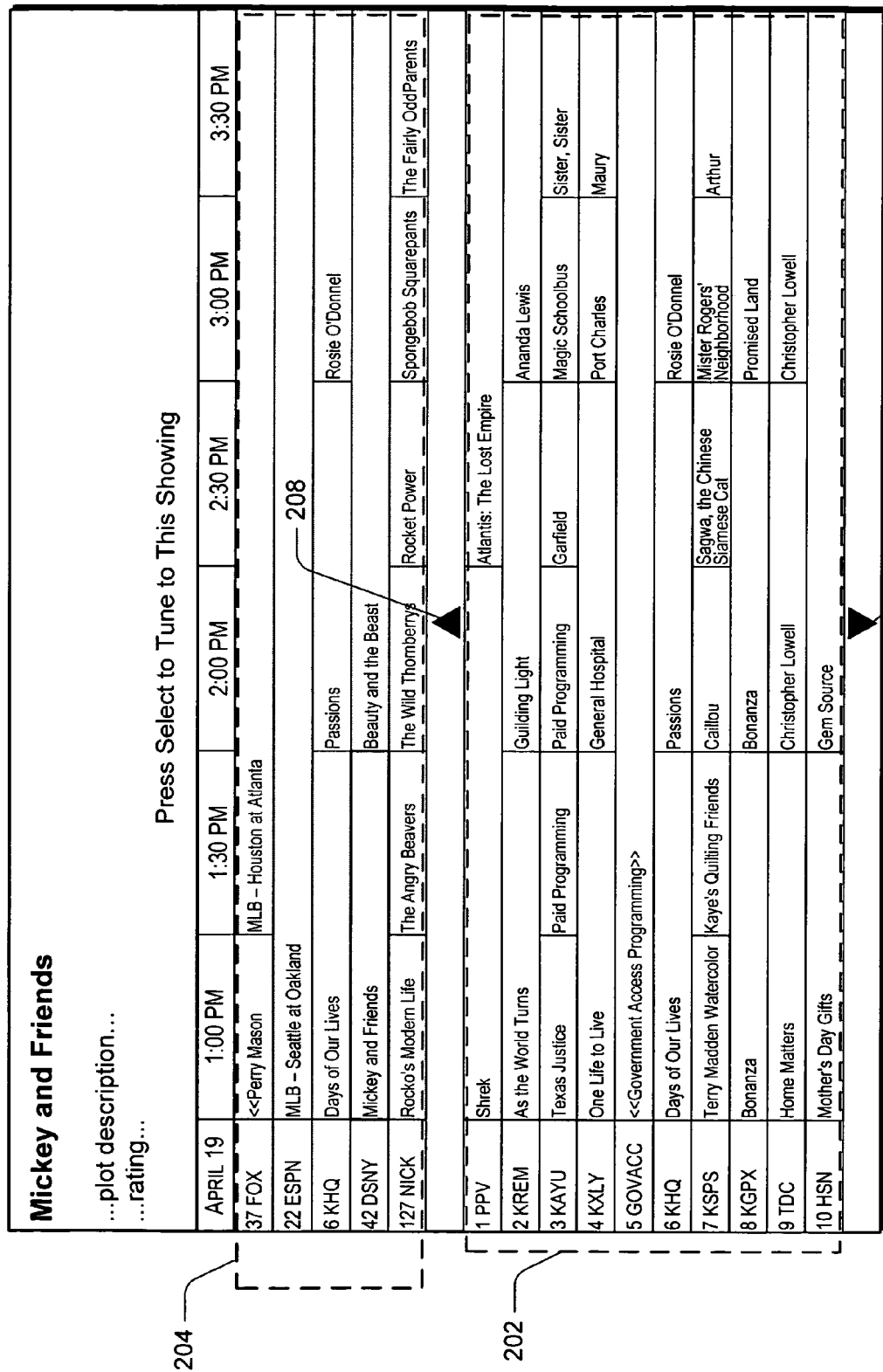
FIG. 2 is an exemplary screen display of an electronic program guide that includes promoted listings.

The following discussion is directed to an electronic program guide through which promoted listings may be displayed. The electronic program guide is implemented as part of a television-based entertainment system, such as an interactive TV network, a cable network that utilizes an electronic program guide, and a Web-enabled TV network. Client devices in such systems range from full-resource clients with substantial memory and processing resources, such as TV-enabled personal computers and TV recorders equipped with hard-disks, to low-resource clients with limited memory and/or processing resources, such as traditional set-top boxes. Promoted listings as described herein can be used in any of these systems and for any types of client devices.

A content distribution system (e.g., a cable television network operator) sells positions within an electronic program guide to content providers. For example, ESPN may purchase the top line of the electronic program guide. Then, when an EPG is displayed to a user associated with the content distribution system, the channel over which ESPN is displayed in the top line of the EPG grid. In alternate implementations, the content distribution system may sell positions within the EPG based on additional criteria. For example, a particular position may be sold to one content provider for viewers within a particular geographic region, and the same position may be sold to another content provider for viewers within another geographic region. As another example, EPG positions may be sold based on subscriber demographics so that, for example, subscribers who are married and between the ages of 40 and 60 may see one channel in the first position of their EPG grid, while subscribers who are single and between the ages of 18 and 25 may see a different channel in the first position of their EPG grid.

Furthermore, in alternate implementations, promoted listings may be associated with a particular program rather than with a particular channel. For example, a level 1 priority may be associated with a specific broadcast of an episode of "Friends" scheduled to be broadcast at 8:00 pm on channel 6. When an EPG is displayed to a user, if it is close to 8:00 pm, then channel 6 is displayed as a promoted listing with priority level 1. In such an implementation, the channels that are displayed in a promoted listings area may change depending on which scheduled programs have priority at any given time of day.

In an exemplary implementation, display and/or user response to promoted listings is tracked. The tracked data may also be used to generate additional billing data. For example, a content provider may pay an initial fee to establish a promoted listing. The content provider may be charged an additional fee for each time the promoted listing is displayed and/or for each time a user selects to view or record a program from the promoted listing (commonly referred to as a "click-through").

EPG with Promoted Listings

FIG. 1 illustrates an exemplary screen display of an electronic program guide (EPG) 100 that includes promoted listings. EPG 100 includes listings area 102, promoted listings area 104, and details area 106.

Listings area 102 is configured to display electronic program guide data. In the illustrated example, channels are listed in the left-most column with scheduled programs listed across the row arranged by time. Promoted listings area 104 is configured to display electronic program guide data associated with promoted listings. In the illustrated example, the first five rows of EPG 100 make up promoted listings area 104. In alternate implementations, more or fewer rows may be used for displaying promoted listings. In alternate implementations, the electronic program guide data may be arranged differently, but with the promoted listing still prominently displayed.

Details area 106 is configured to display additional information associated with a currently selected program. For example, the program title, a description of the program, rating information, and so on may be displayed for a currently selected program. In the illustrated example, the program "Mickey and Friends" is currently selected, as indicated by highlighted grid cell 108.

Scrolling arrows 110 and 112 indicate that more programming data is available and can be accessed by scrolling the display, for example, using an arrow button on a remote control device. In the illustrated example, promoted listings area 104 acts as a subset of listings area 102 such that when the program data is scrolled, the data shown in promoted listings area 104 scrolls with the data in listings area 102. For example, the next page of listings may show programming data associated with channels 11-25.

FIG. 2 illustrates an exemplary screen display of an EPG 200 that includes promoted listings area 202 that does not scroll when listings area 204 is scrolled. As illustrated by the placement of scrolling arrows 206 and 208, when the data displayed in listings area 202 is scrolled (e.g., when a user presses an arrow button on a remote control device), the data in listings area 202 scrolls, but the data in promoted listings area 204 does not scroll. For example, when a scroll command is received, the next page of listings in listing area 202 may show programming data associated with channels 11-20.

Figure 3:
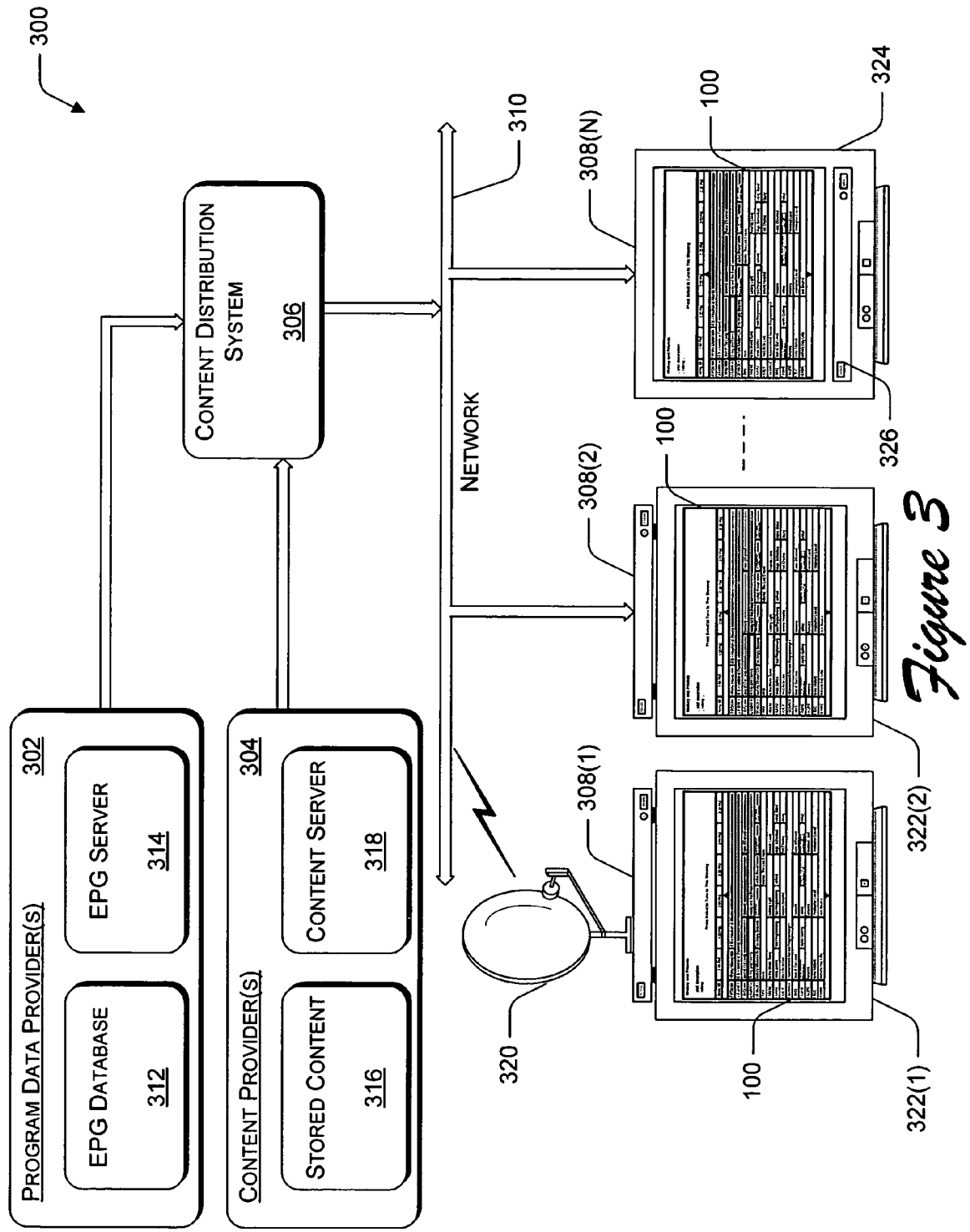
FIG. 3 is a block diagram of an exemplary media entertainment system in which promoted listings may be implemented.

FIG. 3 illustrates an exemplary environment 300 in which promoted listings may be implemented. Exemplary environment 300 is a television entertainment system that facilitates distribution of content and program data to multiple viewers. The environment 300 includes one or more program data providers 302, one or more content providers 304, a content distribution system 306, and multiple client devices 308(1), 308(2), . . . , 308(N) coupled to the content distribution system 306 via a network 310.

Program data providers 302 include an electronic program guide (EPG) database 312 and an EPG server 314. The EPG database 312 stores electronic files of program data, which can be used to generate an electronic program guide (or, "program guide"). Program data includes program identifiers, program titles, ratings, characters, descriptions, actor names, station identifiers, channel identifiers, schedule information, and so on. The terms "program data" and "EPG data" are used interchangeably throughout this discussion. For discussion purposes, an electronic file maintains program data that includes a program descriptor (e.g., a title), a broadcast date to identify dates on which the program will be broadcast, and a broadcast time to identify the time at which the broadcast will begin.

The EPG server 314 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 314 controls distribution of the published version of the program data from program data provider 302 to the content distribution system 306 using, for example, a file transfer protocol (FTP) over a TCP/IP network.

Content providers 304 include a content server 318 and stored content 316, such as movies, television programs, commercials, music, and similar audio and/or video content. Content server 318 controls distribution of the stored content 316 from content provider 304 to the content distribution system 306. Additionally, content server 318 controls distribution of live content (e.g., content that was not previously stored, such as live feeds) and/or content stored at other locations to the content distribution system 306.

Content distribution system 306 is representative of a headend service that provides EPG data, as well as content, to multiple subscribers. Each content distribution system 306 may receive a slightly different version of the program data that takes into account different programming preferences and lineups. The EPG server 314 may create different versions of EPG data (e.g., different versions of a program guide) that include those channels of relevance to respective headend services.

Content distribution system 306 processes the received program data to add priority data that can be used to direct a client device to display portions of the program data as promoted listings. Content distribution system 306 transmits the EPG data to the multiple client devices 308(1), 308(2), . . . , 308(N). In one implementation, for example, distribution system 306 utilizes a carousel file system to repeatedly broadcast the EPG data over an out-of-band (OOB) channel to the client devices 308. Select components of an exemplary content distribution system 306 are described in further detail below with reference to FIG. 4.

Network 310 can include a cable television network, RF, microwave, satellite, and/or data network, such as the Internet, and may also support wired or wireless media using any format and/or protocol, such as broadcast, unicast, or multicast. Additionally, network 310 can be any type of network, using any type of network topology and any network communication protocol, and can be represented or otherwise implemented as a combination of two or more networks.

Environment 300 can include any number of content providers and any number of program data providers coupled to any number of content distribution systems.

Client devices 308 can be implemented in any number of ways. For example, a client device 308(1) receives content from a satellite-based transmitter via a satellite dish 320. Client device 308(1) is also referred to as a set-top box or a satellite receiving device. Client device 308(1) is coupled to a television 322(1) for presenting the content received by the client device (e.g., EPG data, audio data, and video data), as well as a graphical user interface. A particular client device 308 can be coupled to any number of televisions 322 and/or similar devices that can be implemented to display or otherwise render content. Similarly, any number of client devices 308 can be coupled to a television. For example, a personal computer may be implemented as an additional client device capable of receiving EPG data and/or media content and communicating with a set-top box or television.

Client device 308(2) is also coupled to receive content from network 310 and provide the received content to associated television 322(2). Client device 308(N) is an example of a combination television 324 and integrated set-top box 326. In this example, the various components and functionality of the set-top box are incorporated into the television, rather than using two separate devices. The set-top box incorporated into the television may receive signals via a satellite dish (similar to satellite dish 320) and/or via network 310. In alternate implementations, client devices 308 may receive signals via the Internet or any other medium (e.g., broadcast, unicast, or multicast).

Each client 308 runs an electronic program guide (EPG) application that utilizes the program data and priority data to generate an EPG grid that includes promoted listings, as shown in FIGS. 1 and 2. Components of an exemplary client device are described in further detail below with reference to FIGS. 9-11.

Exemplary Content Distribution System

Figure 4:
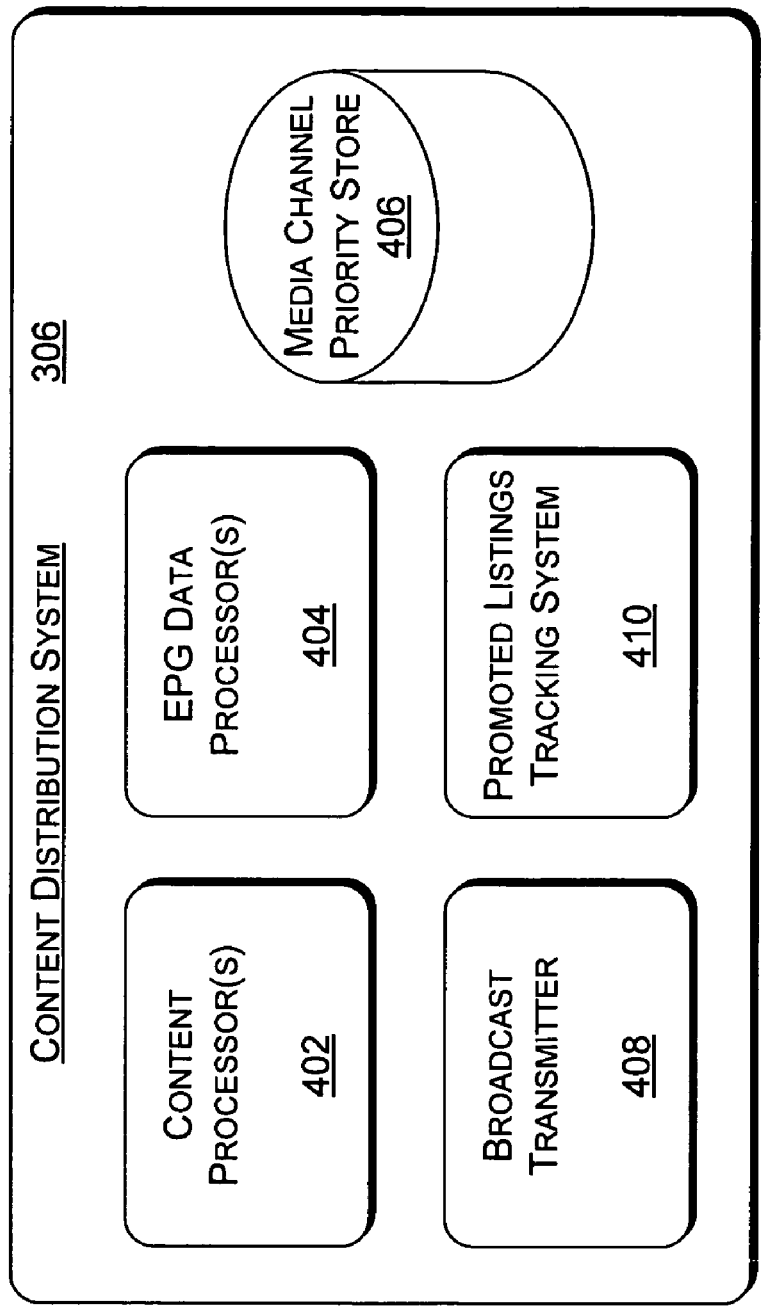
FIG. 4 is a block diagram of selected components of an exemplary content distribution system.

FIG. 4 illustrates select components of an exemplary content distribution system 306, as illustrated in FIG. 3. Content distribution system 306 includes one or more content processors 402, one or more EPG data processors 404, media channel priority store 406, broadcast transmitter 408, and promoted listings tracking system 410. In an alternate implementation, promoted listings tracking system 410 may be implemented as a separate system, rather than as a component of content distribution system 306.

Content processor 402 processes the content received from content provider 304 prior to transmitting the content across network 310. A particular content processor may, for example, encode, or otherwise process, the received content into a format that is understood by the multiple client devices 308(1), 308(2), . . . , 308(N) coupled to network 310.

Media channel priority store 406 maintains data that indicates priorities that are to be associated with one or more channels over which media content is transmitted so that programming data associated with those channels can be displayed according to the priorities. Alternatively, data maintained in media channel priority store 406 may indicate priorities associated with particular programs, rather than with channels.

EPG data processor 404 processes the program data received from program data provider 302 prior to transmitting the program data across network 310. In the described exemplary implementation, EPG data processor 404 associates priority data with portions of the program data based on the data maintained by media channel priority store 424. For example, if a particular content provider (e.g., HBO, NBC, ESPN, etc.) has purchased a promoted listing, data identifying a priority to be associated with a program and/or a channel for which the priority was purchased is stored in media channel priority store 406. When content distribution system 306 receives program data identifying the program or channel for which a content provider has purchased a priority, the priority stored in media channel priority store is associated with the received program data. Accordingly, when the program data is transmitted over network 310 to the client devices 308, the program data includes the priority data so that the client devices 308 can display the program data according to the priority.

Broadcast transmitter 408 broadcasts signals, such as cable television signals, which may include content and/or programming data, across network 310.

Promoted listings tracking system 410 is configured to receive from client device 308 data associated with promoted listings that have been displayed and/or selected by a user. For example, in one implementation, promoted listings tracking system 410 may receive data that indicates which promoted listings have been displayed. The data may also include other information, such as days and times at which the promoted listings have been displayed. In an alternate implementation, promoted listings tracking system 410 may receive data that indicates which programs have been selected by a user via a promoted listing. For example, referring to FIG. 1, a user may press a select button while the highlighted program "Mickey and Friends" is highlighted, causing the client device to tune to (or otherwise begin displaying) the program. The client device may then transmit data to promoted listings tracking system 410 indicating that the program "Mickey and Friends" was selected by a user via the promoted listing.

In an exemplary implementation, promoted listing tracking system 410 is further configured to generate and transmit billing data to content providers 304 based on the promoted listings tracking data. For example, a content provider 304 may pay an initial fee to establish a promoted listing. The content provider 304 may be charged an additional fee for each time that the promoted listing is displayed via a client device and/or for each time that a user selects a program via a promoted listing.

Exemplary Data Flow

Figure 5:
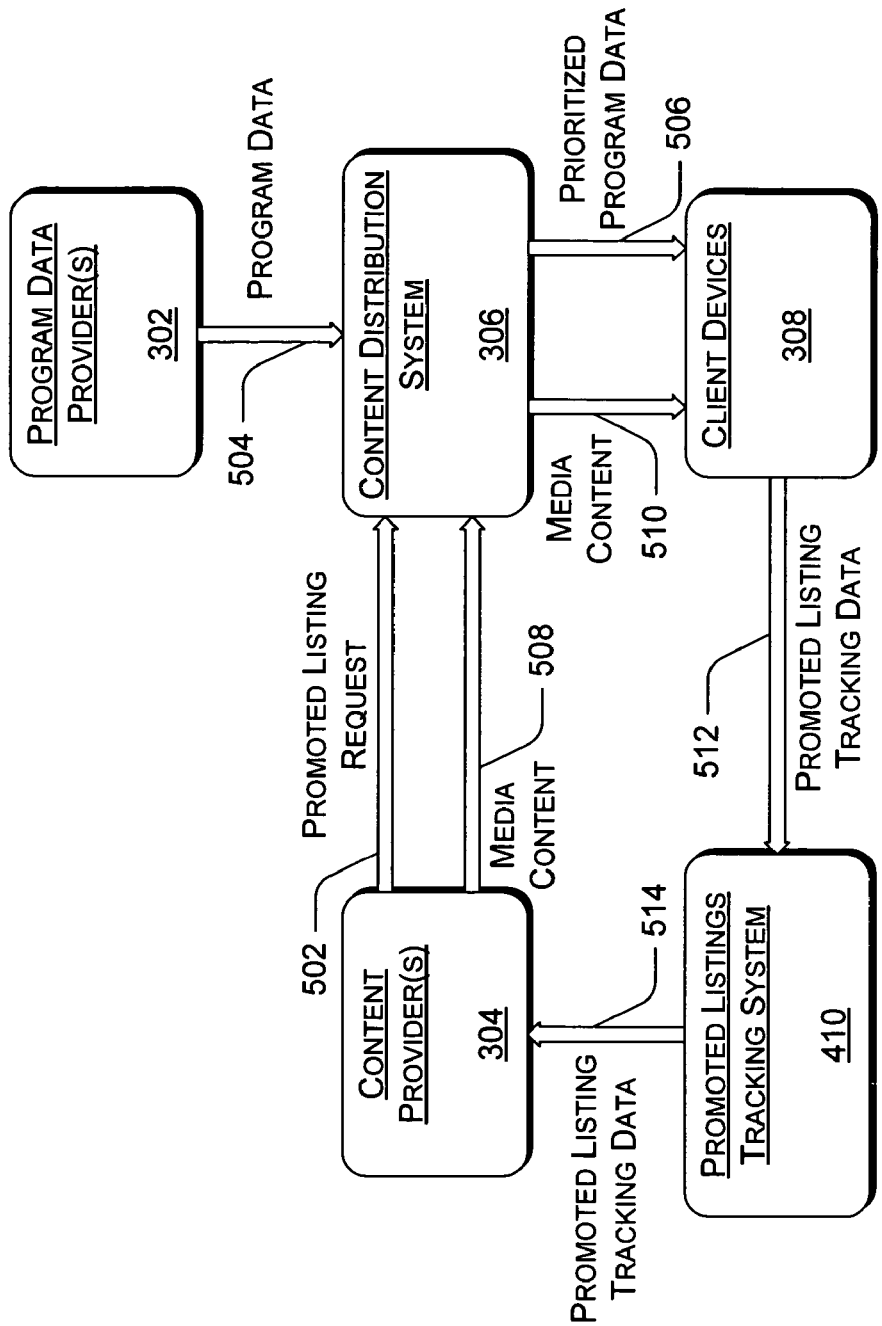
FIG. 5 is a block diagram of an exemplary data flow among components of an exemplary media entertainment system that supports promoted listings.

FIG. 5 illustrates an exemplary data flow among components of environment 300 in support of promoted listings. Arrow 502 indicates that content provider 304 requests a promoted listing from content distribution system 306. For example, content distribution system 306 may offer promoted listings for sale to one or more content providers. Content provider 304 then responds to the offer by purchasing a particular priority with which listings associated with the content provider will be displayed to viewers. A network-wide priority may be purchased such that the channel associated with the priority is displayed as a promoted listing in a particular position to the subscribers associated with content distribution system 306. Alternatively, a geographically dynamic priority may be purchased such that the channel for which the priority was purchased is displayed as a promoted listing to subscribers who are located within a particular geographic region. In another alternate implementation, a demographically dynamic priority may be purchased such that the channel for which the priority was purchased is displayed as a promoted listing to subscribers who have a demographic attribute that matches a demographic attribute associated with the purchased priority.

Arrow 504 indicates that program data provider 302 transmits program data to content distribution system 306. The program data identifies media content that is scheduled for broadcast during a particular period of time (e.g., two weeks). Content distribution system 306 modifies the received program data to include priority data that identifies priorities that have been purchased by content providers 304. As indicated by arrow 506, content distribution system 306 then transmits the modified program data that includes the priority data to client devices 308. As described above, client devices 308 are configured to generate an EPG display that includes promoted listings for presenting the received program data.

Arrow 508 indicates that content providers 304 transmit media content to content distribution system 306. The media content is processed by content distribution system 306, and then transmitted (as indicated by arrow 510) to client devices 308.

As described above, in an exemplary implementation, environment 300 also includes a promoted listings tracking system, which, in FIG. 4, is illustrated as a component of content distribution 306. In an alternate implementation, promoted listings tracking system 410 may be implemented as a separate component configured to receive data from client device 308. In an implementation that includes promoted listings tracking system 410, client device 308 generates data that indicates, for example, how often a particular promoted listing is displayed and/or selected by a viewer. Arrow 512 indicates that client device 308 then transmits the tracking data to promoted listings tracking system 410.

Promoted listings tracking system 410 receives tracking data from multiple client devices. The received data is then aggregated and formatted. As indicated by arrow 514, promoted listings tracking system 410 transmits tracking data to content providers 304. The tracking data can be transmitted to content providers 304 merely to provide feedback as to how effective the promoted listings have been. Alternatively, promoted listings tracking system, generates billing data that is transmitted to content providers 304. The billing data may be based, for example, on how often a particular promoted listing has been displayed and/or selected.

Priority Data Structure

Figure 6:
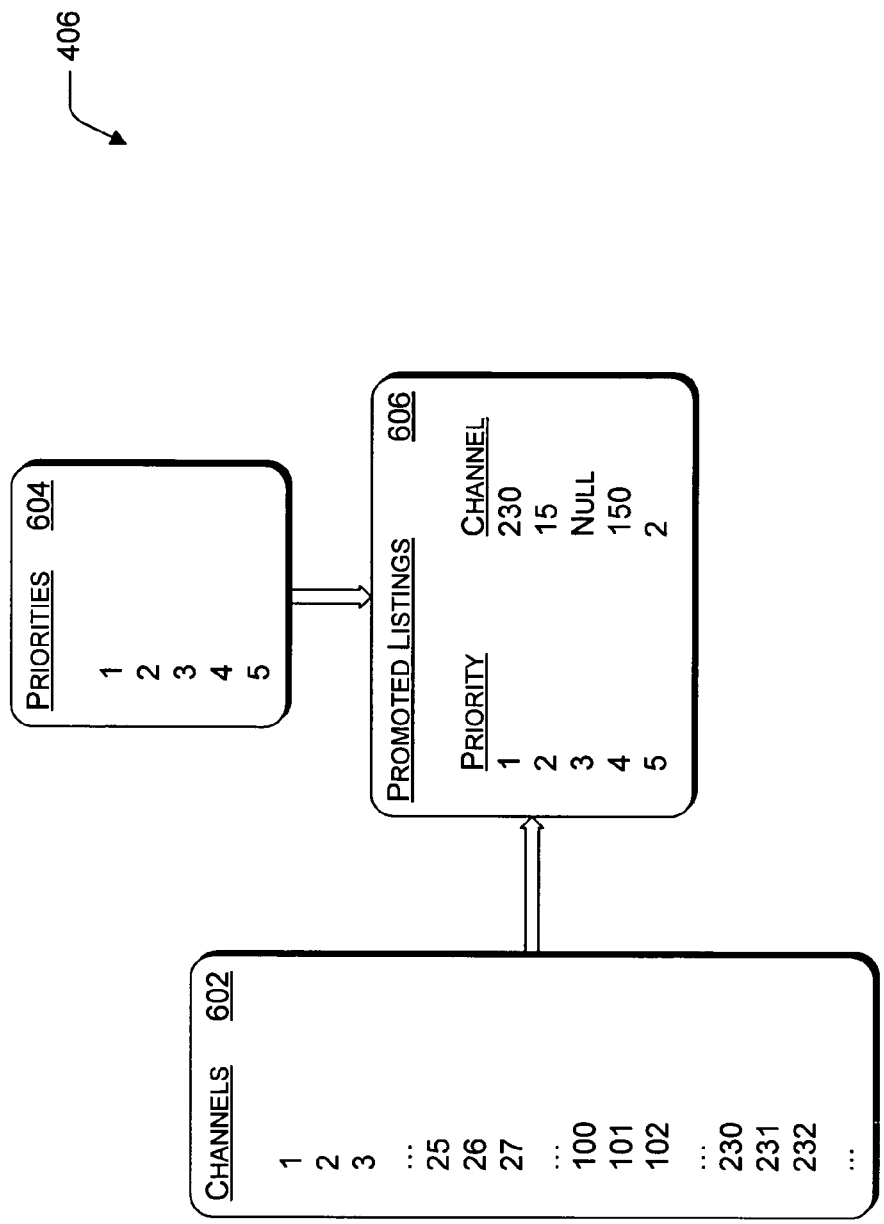
FIG. 6 is a block diagram of an exemplary data structure that may be implemented to support promoted listings.

FIG. 6 illustrates an exemplary data structure of media channel priority store 406 to support network-wide promoted listings. In the illustrated data structure, a list of broadcast channels and a list of available priorities are maintained, as represented by boxes 602 and 604, respectively. Box 606 represents data that indicates which of channels 602 are associated with each available priority 604. In the illustrated example, an EPG generated based on the data would list channels 230, 15, 150, and 2 as promoted listings, in that order. Because no channel is associated with priority 3, only four listings are promoted, rather than the available five. Although not illustrated, rather than being associated with a channel, a priority may be associated with a particular scheduled broadcast of a particular program. This may be represented in media channel priority store 406, for example, as priorities associated with combinations of channel and broadcast date/time.

Figure 7:
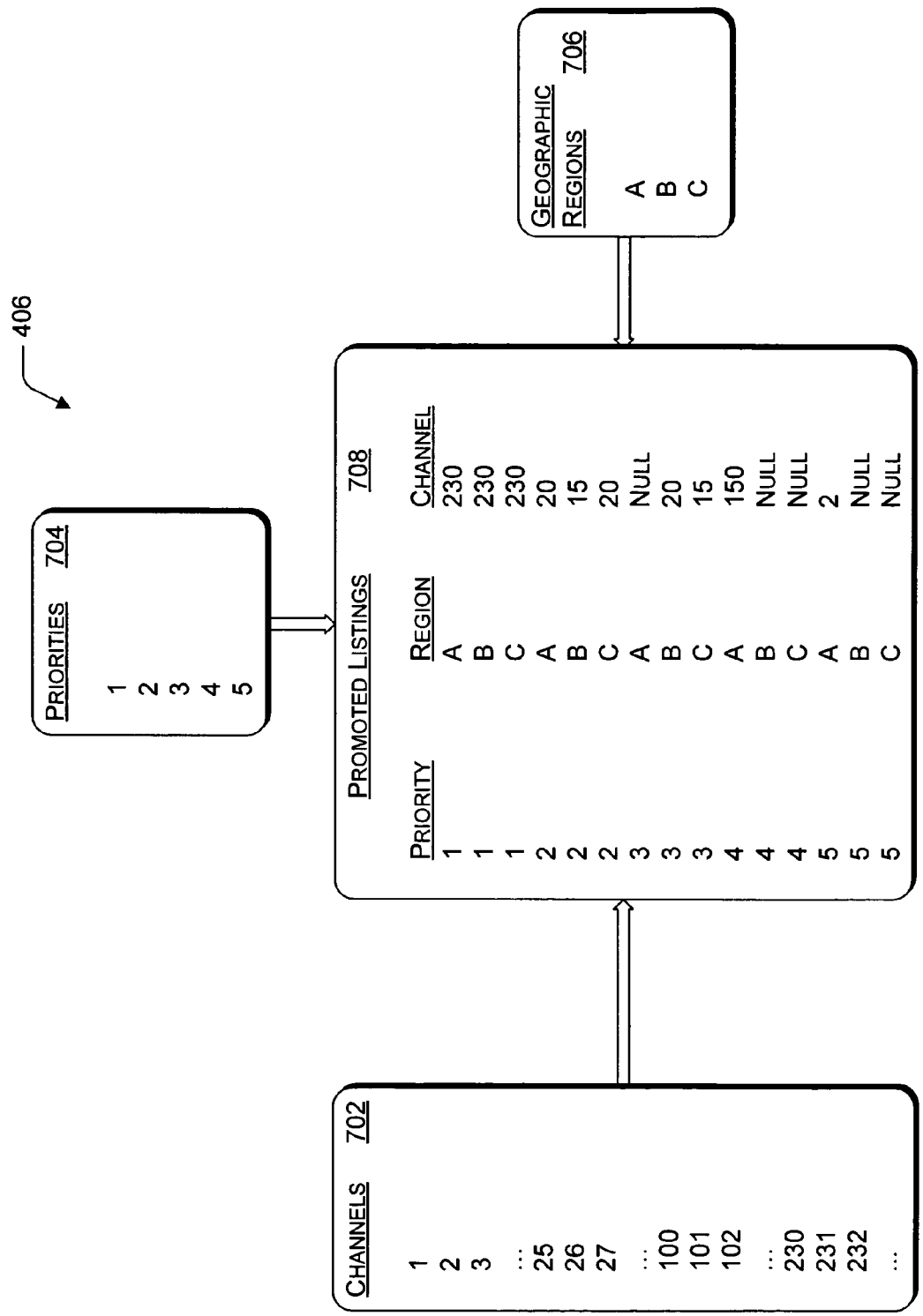
FIG. 7 is a block diagram of an exemplary data structure that may be implemented to support promoted listings.

FIG. 7 illustrates an exemplary data structure of media channel priority store 406 to support geographically dynamic promoted listings. In the illustrated data structure, a list of broadcast channels, a list of available priorities, and a list of geographic regions are maintained, as represented by boxes 702, 704, and 706, respectively. Box 708 represents data that indicates which of channels 702 are associated with each available priority 704 in combination with each available geographic region 706. In the illustrated example, for a client device associated with geographic region A, an EPG generated based on the data would list channels 230, 20, 150, and 2 as promoted listings, in that order. For a client device associated with geographic region B, an EPG generated based on the data would list channels 230, 15, and 20 as promoted listings, in that order. Similarly, for a client device associated with geographic region C, an EPG generated based on the data would list channels 230, 20, and 15 as promoted listings, in that order. As described above with reference to FIG. 6, priorities may be associated with particular broadcasts of particular programs, rather than with broadcast channels. By associating priorities with programs, rather than with channels, the promoted listings can be more targeted. For example, because programs of many different types can be broadcast over the same channel, by associating priorities with specific programs, a particular channel may have one priority at one time and another priority (or no priority) at another time.

Figure 8:
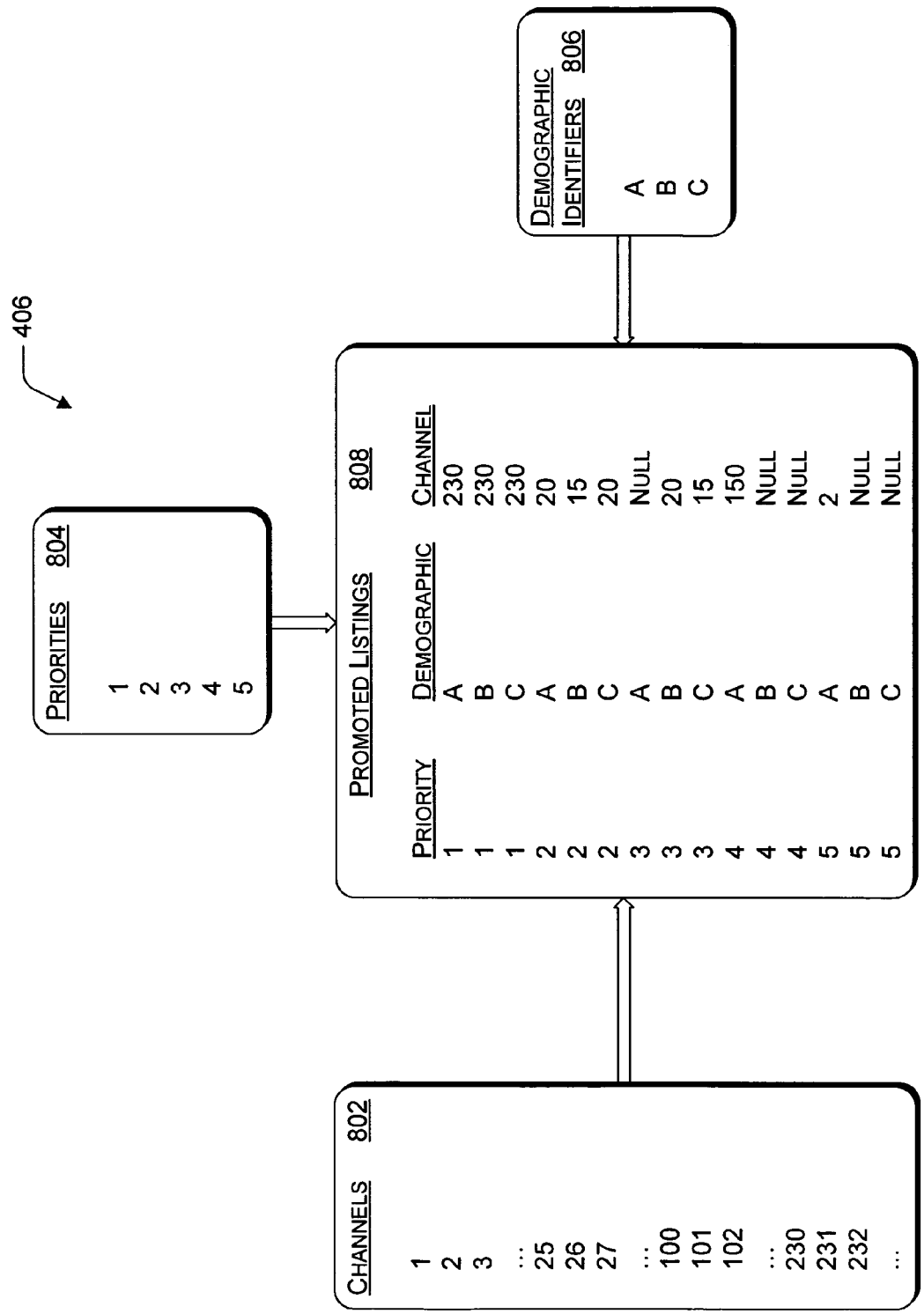
FIG. 8 is a block diagram of an exemplary data structure that may be implemented to support promoted listings.

FIG. 8 illustrates an exemplary data structure of media channel priority store 406 to support demographically dynamic promoted listings. In the illustrated data structure, a list of broadcast channels, a list of available priorities, and a list of demographic identifiers are maintained, as represented by boxes 802, 804, and 806, respectively. Box 808 represents data that indicates which of channels 802 are associated with each available priority 804 in combination with each demographic identifier 806. In the illustrated example, for a client device associated with demographic region A, an EPG generated based on the data would list channels 230, 20, 150, and 2 as promoted listings, in that order. For a client device associated with demographic region B, an EPG generated based on the data would list channels 230, 15, and 20 as promoted listings, in that order. Similarly, for a client device associated with demographic region C, an EPG generated based on the data would list channels 230, 20, and 15 as promoted listings, in that order.

Exemplary Client Device

Figure 9:
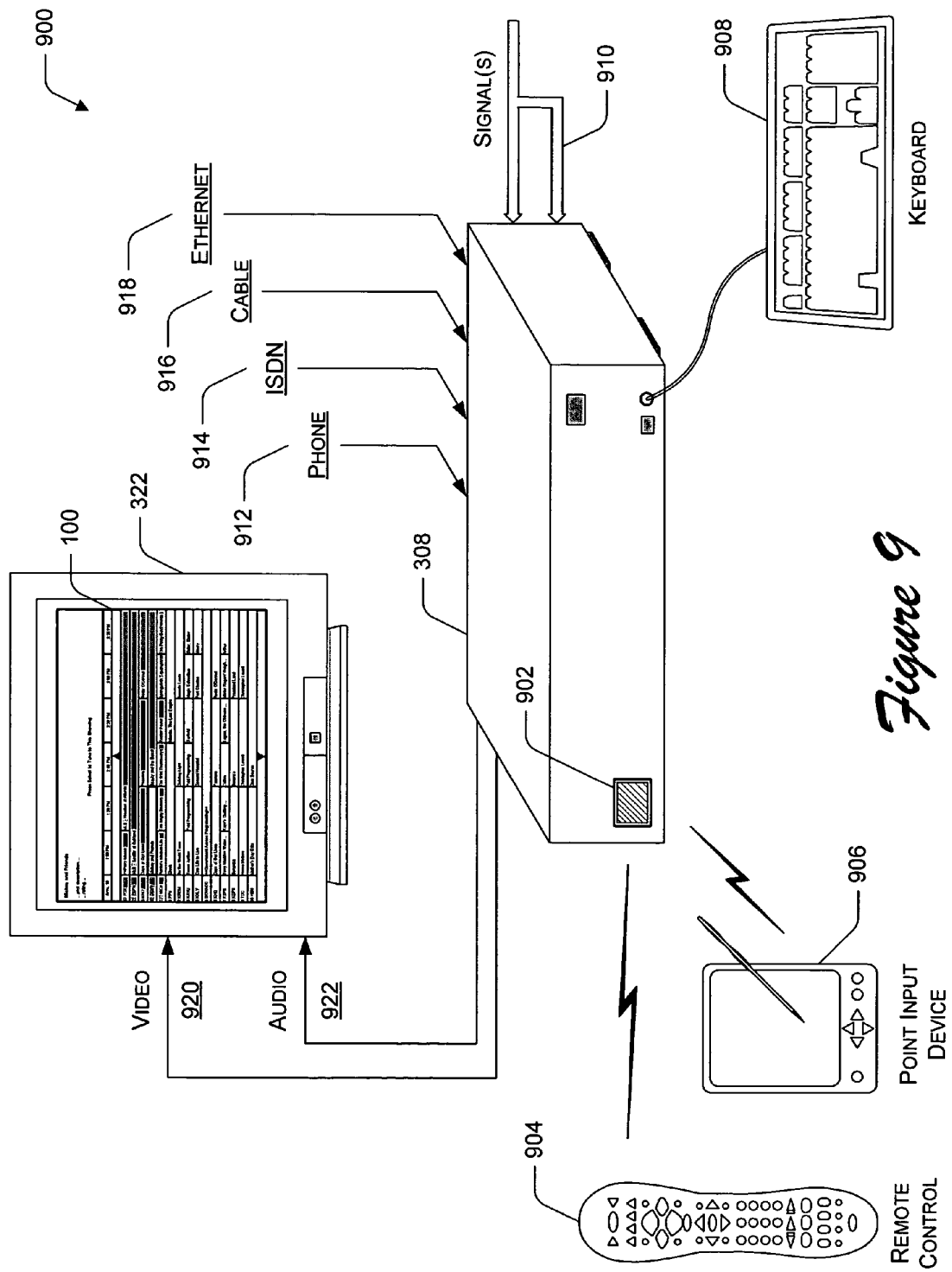
FIG. 9 is a pictorial diagram of an exemplary implementation of a client device shown as a standalone unit that connects to a television.

FIG. 9 illustrates an exemplary implementation 900 of a client device 308 shown as a standalone unit that connects to a television 322. Client device 308 can be implemented in any number of embodiments, including as a set-top box, a satellite receiver, a TV recorder with a hard disk, a game console, an information appliance, a personal computer, and so forth. Client device 308 includes a wireless receiving port 902, such as an infrared (IR) or Bluetooth wireless port, for receiving wireless communications from a remote control device 904, a handheld input device 906, or any other wireless device, such as a wireless keyboard. Handheld input device 906 can be a personal digital assistant (PDA), handheld computer, wireless phone, or the like. Additionally, a wired keyboard 908 may be coupled to communicate with the client device 308. In alternate embodiments, remote control device 904, handheld device 906, and/or keyboard 908 may use an RF communication link or other mode of transmission to communicate with client device 308.

Client device 308 receives one or more signals 910 from one or more sources, such as from a satellite, the Internet, or a broadcast network. Signals 910 may include, but are not limited to, broadcast, unicast, or multicast signals. Client device 308 includes hardware and/or software for receiving and decoding signal 910, such as an NTSC, PAL, SECAM or other TV system video signal. Client device 308 also includes hardware and/or software for providing the user with a graphical user interface by which the user can, for example, access various network services, configure the client device 308, and perform other functions.

Client device 308 is capable of communicating with other devices via one or more connections including a conventional telephone link 912, an ISDN link 914, a cable link 916, and an Ethernet link 918. Client device 308 may use any one or more of the various communication links 912-918 at a particular instant to communicate with any number of other devices.

Client device 308 generates video signal(s) 920 and audio signal(s) 922, both of which are communicated to television 322. The video signals and audio signals can be communicated from client device 308 to television 322 via an RF (radio frequency) link, S-video link, composite video link, component video link, or other communication link. Although not shown in FIG. 9, client device 308 may include one or more lights or other indicators identifying the current status of the device. Additionally, the client device may include one or more control buttons, switches, or other selectable controls for controlling operation of the device.

Figure 10:
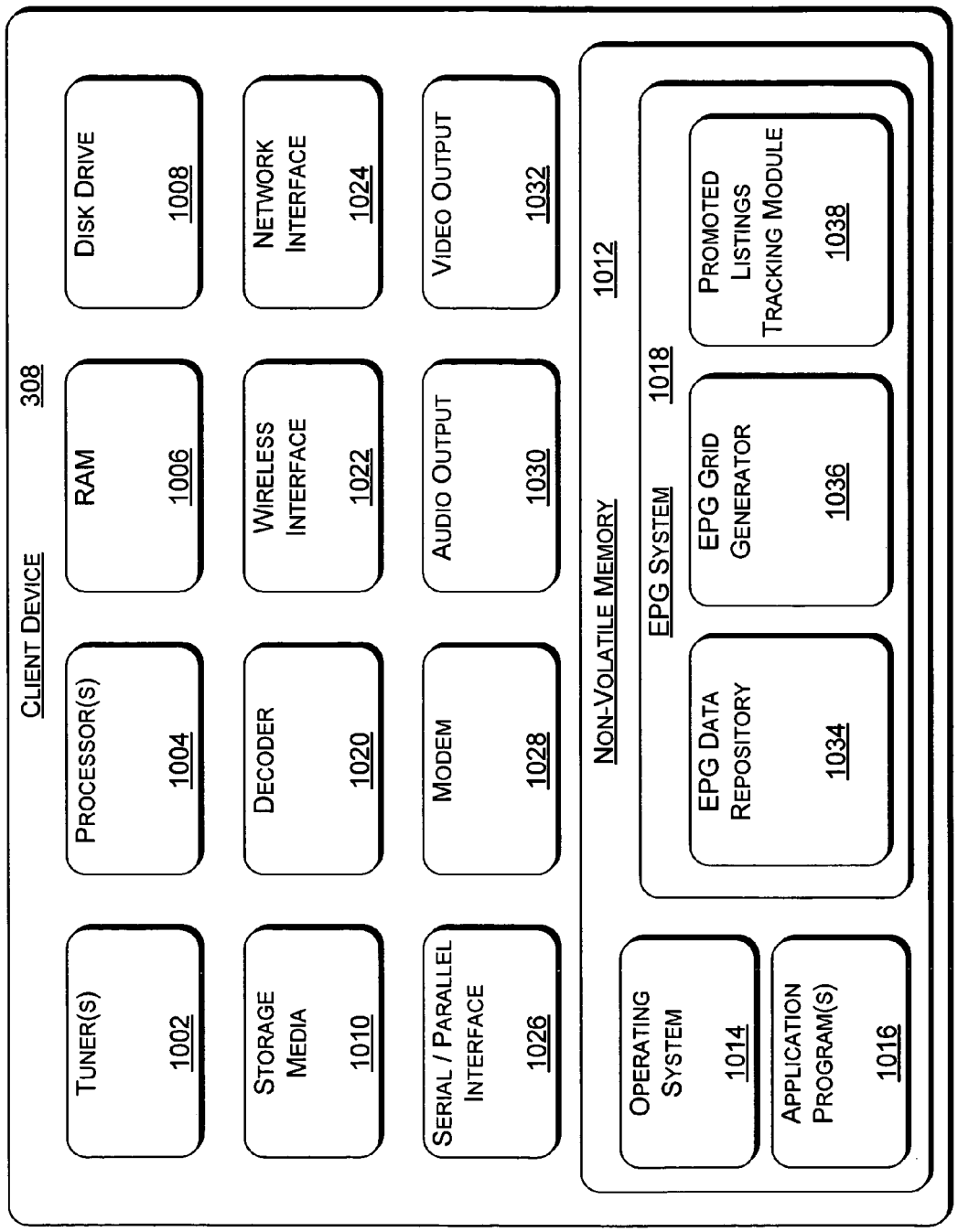
FIG. 10 is a block diagram of selected components of an exemplary client device configured to support promoted listings.

FIG. 10 illustrates selected components of client device 308 shown in FIGS. 3 and 9. Client device 308 includes one or more tuners 1002. Tuners 1002 are representative of one or more in-band tuners that tune to various frequencies or channels to receive television signals, as well as an out-of-band tuner that tunes to a channel over which the EPG data is transmitted to client device 208. Tuners 1002 may also be representative of any other means with which media content may be received. For example, in an environment that supports transmission of media content over an IP network, tuner 1002 may represent an Internet browser configured to receive media content via a particular universal resource locator (URL).

Client device 308 also includes one or more processors 1004 and one or more memory components. Examples of possible memory components include a random access memory (RAM) 1006, a disk drive 1008, a mass storage component 1010, and a non-volatile memory 1012 (e.g., ROM, Flash, EPROM, EEPROM, etc.). Alternative implementations of client device 308 can include a range of processing and memory capabilities, and may include more or fewer types of memory components than those illustrated in FIG. 10. For example, full-resource clients can be implemented with substantial memory and processing resources, including the disk drive 1008 to store content for replay by the viewer. Low-resource clients, however, may have limited processing and memory capabilities, such as a limited amount of RAM 1006, no disk drive 1008, and limited processing capabilities.

Processor(s) 1004 process various instructions to control the operation of client device 308 and to communicate with other electronic and computing devices. The memory components (e.g., RAM 1006, disk drive 1008, storage media 1010, and non-volatile memory 1012) store various information and/or data such as content, EPG data, configuration information for client device 308, and/or graphical user interface information.

An operating system 1014 and one or more application programs 1016 may be stored in non-volatile memory 1012 and executed on processor 1004 to provide a runtime environment. A runtime environment facilitates extensibility of client device 308 by allowing various interfaces to be defined that, in turn, allow application programs 1016 to interact with client device 308. In the illustrated example, an EPG system 1018 is stored in memory 412 to operate on the EPG data to generate an EPG grid with promoted listings. The application programs 1016 that may be implemented at client device 308 can include, for example, a browser to browse the Internet, an email program to facilitate electronic mail, and so on. Client device 308 can also include other components pertaining to a television entertainment system which are not illustrated in this example for simplicity purposes. For instance, client device 308 can include a user interface application and user interface lights, buttons, controls, etc. to facilitate viewer interaction with the device.

EPG system 1018 includes EPG data repository 1034 and EPG grid generator 1036. An exemplary implementation of EPG system 1018 also includes promoted listings tracking module 1038. EPG data repository 1034 is configured to maintain EPG data that is received from content distribution system 306.

EPG grid generator 1036 is configured to generate an EPG for displaying the EPG data. EPG grid generator 1036 is configured to arrange the EPG data based on the priority data that is received as part of the EPG data. If the priority data is dynamic, EPG grid generator 1036 may also be configured to determine the priority associated with a particular listing, based, for example, on a geographic or demographic identifier associated with client device 308. In an exemplary implementation, if a priority is associated with a particular program, the EPG grid generation may also be based on time. For example, if a particular program scheduled for broadcast at a particular time is to be displayed as a promoted listing, then at some time prior to the scheduled broadcast time of the program, the channel on which the program is scheduled for broadcast is displayed within a promoted listings area of the EPG. For example, if the EPG guide is requested from a user (e.g., by pressing a guide button on a remote control device) 15 minutes or less before the scheduled broadcast of a promoted program, then the program data associated with the channel on which the program is scheduled to be broadcast is rendered in a promoted listings area.

Promoted listings tracking module 1038 is configured to gather data that indicates, for example, how often a particular promoted listing is displayed and/or how often a particular promoted listing is selected (i.e., a click-through). Promoted listings tracking module then transmits the gathered data to a promoted listings tracking system, which may be implemented as a separate system or as a component of content distribution system 306.

Client device 308 also includes a decoder 1020 to decode a video signal, such as an NTSC, PAL, SECAM or other TV system video signal. Client device 308 further includes a wireless interface 1022, a network interface 1024, a serial and/or parallel interface 1026, and a modem 1028. Wireless interface 1022 allows client device 308 to receive input commands and other information from a user-operated input device, such as from a remote control device or from another IR, Bluetooth, or similar RF input device.

Network interface 1024 and serial and/or parallel interface 1026 allows client device 308 to interact and communicate with other electronic and computing devices via various communication links. Although not shown, client device 308 may also include other types of data communication interfaces to communicate with other devices. Modem 1028 facilitates communication between client device 308 and other electronic and computing devices via a conventional telephone line.

Client device 308 also includes an audio output 1030 and a video output 1032 that provide signals to a television or other device that processes and/or presents or otherwise renders the audio and video data. Although shown separately, some of the components of client device 308 may be implemented in an application specific integrated circuit (ASIC). Additionally, a system bus (not shown) typically connects the various components within client device 308. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 308. As used herein, "client device" means any electronic device having data communications, data storage capabilities, and/or functions to process signals, such as broadcast signals, received from any of a number of different sources. In one implementation, functionality of the client device may be distributed such that one device, for example a personal computer, renders the EPG grid, including promoted listings, and communicates with a set-top box that receives and processes broadcast signals.

Assigning Priorities to Programming Data

Figure 11:
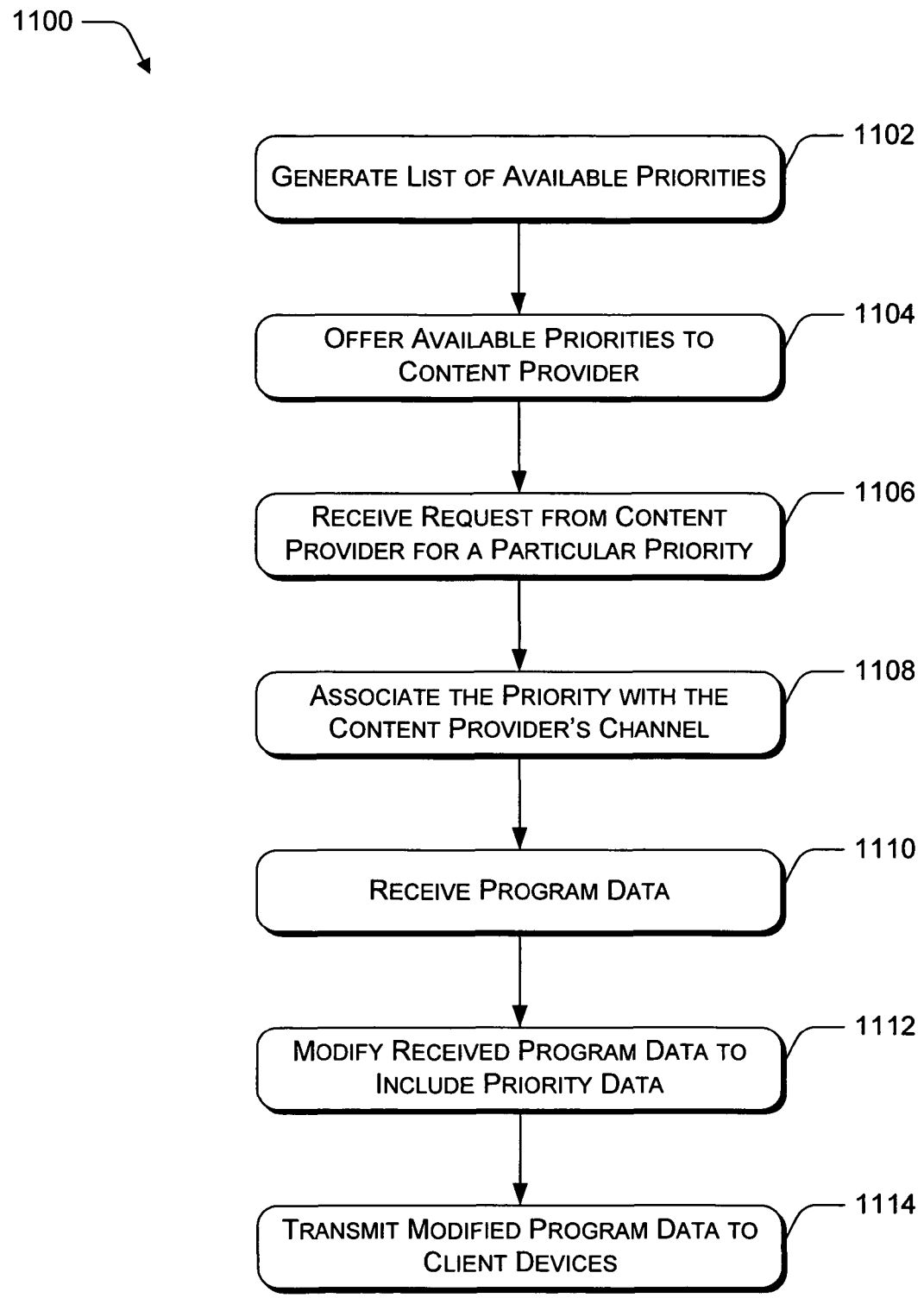
FIG. 11 is a flow diagram of an exemplary method for generating prioritized listing data.

FIG. 11 illustrates a process 1100 for associating priorities with programming data. The process is illustrated as a set of operations shown as discrete blocks. The process may be implemented in any suitable hardware, software, firmware, or combination thereof. The order in which the operations are described is not to be construed as a limitation.

At block 1102, content distribution system 306 generates a list of available priorities. For example, referring to FIG. 6, priority value 3 is available (i.e., priority value 3 does not have an associated channel). As another example, referring to FIG. 7, the following priority/geographic region combinations are available: 3/A, 4/B, 4/C, 5/B, and 5/C. In other words, for client devices within geographic region A, priority value 3 is available; for client devices within geographic region B, priority values 4 and 5 are available; and for client devices within geographic region C, priority values 4 and 5 are available.

At block 1104, content distribution system 306 offers the available priorities to one or more content providers. For example, content distribution system 306 may provide an interface, such as a web site, through which content providers 304 can purchase one or more available priorities.

At block 1106, content distribution system 306 receives a request from a content provider for a particular priority. For example, a content provider may access a web site associated with content distribution system 306, and through that web site purchase a particular priority. In an exemplary implementation, a content provider may purchase a priority that will be applied network wide, a priority that is geographically based, or a priority that is demographically based. The purchased priority may be associated with a specific program or with a particular channel.

At block 1108, content distribution system 306 associates the purchased priority with the program or channel indicated by the content provider that purchased the priority. For example, referring to FIG. 7, a content provider (associated with broadcast channel 101) may purchase priority 3 for geographic region A to be associated with channel 101. Content distribution system 306 then associates channel 101 with the combination of priority level 3 and region A in block 708.

At block 1110, content distribution system 306 receives program data. For example, content distribution system 306 receives program data from program data provider 302 that identifies programs scheduled for broadcast over the next two weeks (or other predefined period of time).

At block 1112, content distribution system 306 modifies the received program data to include priority data. For example, referring to FIG. 4, data processor 404 extracts priority data from media channel priority store 406 to enhance the received program data to include the appropriate priority data.

At block 1114, content distribution system 306 transmits the modified program data to client devices 308.

Generating EPG Display with Promoted Listings

Figure 12:
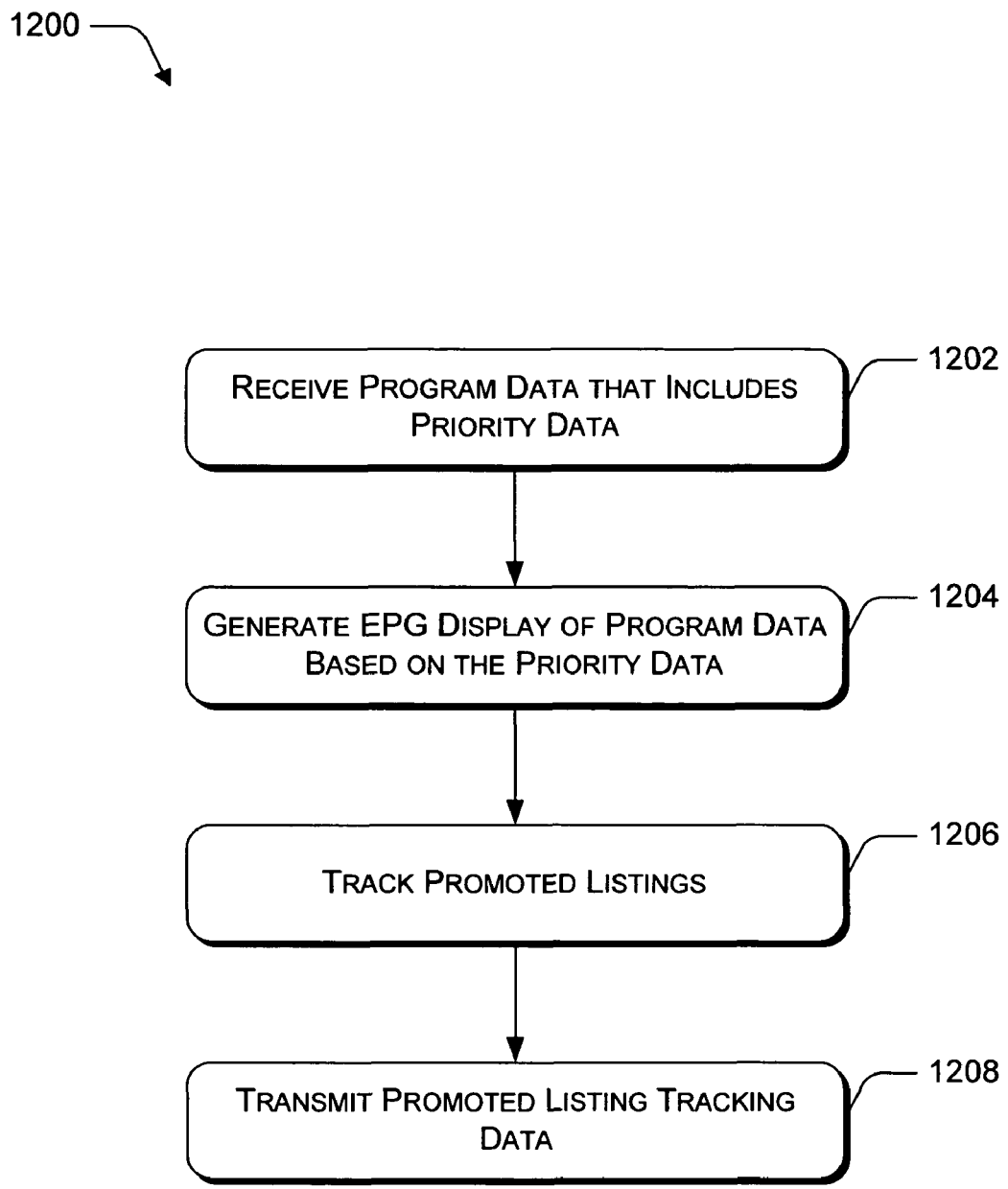
FIG. 12 is a flow diagram of an exemplary method for generating an EPG display that includes promoted listings.

FIG. 12 illustrates a process 1200 for generating an EPG display that includes promoted listings. The process is illustrated as a set of operations shown as discrete blocks. The process may be implemented in any suitable hardware, software, firmware, or combination thereof. The order in which the operations are described is not to be construed as a limitation.

At block 1202, client device 308 receives program data that includes priority data. As described above, priority data may be, for example, static, geographically dynamic, or demographically dynamic. Furthermore, priority data may be associated with channels and/or particular programs. In an exemplary implementation, program data received at a particular client device 308 may include any combination of static priority data, geographically dynamic priority data, and/or demographically dynamic priority data. Referring to FIG. 10, the received program data is stored in EPG data repository 1034.

At block 1204, EPG grid generator 1036 generates an EPG display of at least a portion of the received program data that includes promoted listings based on the priority data. For example, if the program data includes dynamic priority data, EPG grid generator 1036 determines which priorities to apply, based on, for example, a geographic identifier associated with the client device and/or one or more demographic identifiers associated with the client device.

At block 1206, promoted listings tracking module 1038 tracks promoted listings. For example, promoted listings tracking module 1038 may record each time a particular promoted listing is displayed, for example, when a user presses a guide button on a remote control device. Furthermore, promoted listings tracking module 1038 may record each time a particular promoted listing is selected by a user, for example, when a user presses a select button while a promoted listing is highlighted, causing the client device to tune to the selected program.

At block 1208, promoted listings tracking module 1038 transmits the generated tracking data to a promoted listings tracking system such as promoted listings tracking system 410 illustrated in FIG. 4.

Reporting Results of Promoted Listings

Figure 13:
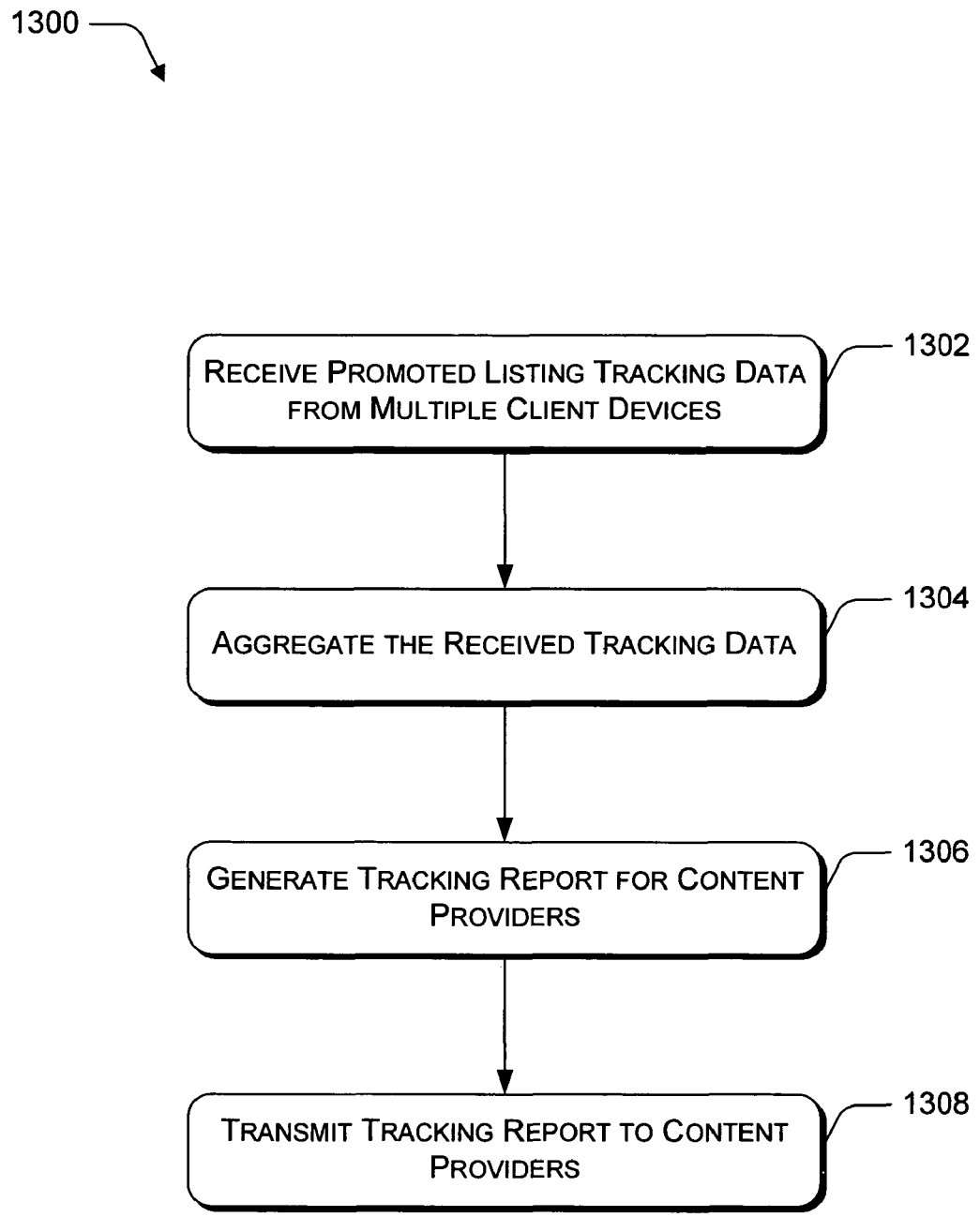
FIG. 13 is a flow diagram of an exemplary method for reporting results associated with promoted listings.

FIG. 13 illustrates a process 1300 for reporting results of promoted listings. The process is illustrated as a set of operations shown as discrete blocks. The process may be implemented in any suitable hardware, software, firmware, or combination thereof. The order in which the operations are described is not to be construed as a limitation.

At block 1302, promoted listings tracking system 410 receives promoted listing tracking data from multiple client devices.

At block 1304, promoted listings tracking system 410 aggregates the received listing tracking data. For example, promoted listings tracking system 410 may gather several weeks' worth of data from multiple clients. The gathered data is then arranged by listing so that tracking data can be transmitted to the appropriate content providers that previously purchased the promoted listings.

In an exemplary implementation, promoted listings tracking system 410 generates an additional bill to be applied to a particular content provider based on the tracking data. For example, a bill may be generated in which the content provider is charged a fee for each time that a particular listing is displayed in a promoted position. Furthermore, a bill may be generated in which the content provider is charged a fee for each time that a particular listing is selected by a user from a promoted position within an EPG display.

At block 1306, promoted listings tracking system 410 generates tracking reports for content providers. For example, the data that is gathered as described above with reference to block 1304 is then arranged by listing so that tracking data can be transmitted to the appropriate content providers that previously purchased the promoted listings. The generated tracking reports may be used to provide feedback to the content providers regarding the effectiveness of the promoted listings.

In an exemplary implementation, the generated tracking reports are in the form of an additional bill to be applied to a particular content provider based on the tracking data. For example, a bill may be generated in which the content provider is charged a fee for each time that a particular listing is displayed in a promoted position. Furthermore, a bill may be generated in which the content provider is charged a fee for each time that a particular listing is selected by a user from a promoted position within an EPG display.

At block 1308, promoted listings tracking system 410 transmits the generated tracking reports to the appropriate content providers.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
receiving, by a content distribution system, programming data that identifies a plurality of channels over which a plurality of media programs are scheduled for transmission to a client device over a network;
associating, by the content distribution system, a display listing priority with a particular one of the channels or media programs, the display listing priority being offered to a content provider;
generating, by the content distribution system, an electronic program guide ("EPG") and EPG data that includes the programming data and the display listing priority;
transmitting, by the content distribution system, the EPG and EPG data to the client device;
receiving, by the content distribution system, tracking data from the client device, the tracking data including feedback relating to an effectiveness of the display listing priority;
transmitting, by the content distribution system, tracking data to the content provider; and
transmitting, by the content distribution system, billing data to the content provider, the billing data based, at least partially, on the feedback relating to the effectiveness of the display listing priority;
wherein:
the EPG includes a listings area and a promoted listings area;
the listings area and the promoted listings area are distinct;
the listings area is configured to display EPG data;
the promoted listing area is configured to display EPG data associated with the display listing priority; and
the EPG data associated with the display listing priority are ranked according to the display listing priority in the promoted listings area.

2. The method as recited in claim 1, wherein the network comprises at least one of a television network or a computer network.

3. The method as recited in claim 1, wherein the network comprises at least one of broadcast television network, a cable television network, a satellite network, the Internet, a wide area network, a local area network, or a wireless network.

4. The method as recited in claim 1, wherein the display listing priority is static, such that the display listing priority associated with the particular one of the channels does not change.

5. The method as recited in claim 1, wherein the display listing priority is geographically dynamic, such that the display listing priority associated with the particular one of the channels may differ depending upon a geographic region within which the client device is located.

6. The method as recited in claim 5, wherein the display listing priority comprises:
a first display listing priority and an associated first geographic region identifier; and
a second display listing priority and an associated second geographic region identifier, such that if the client device is associated with the first geographic region identifier, then the particular one of the channels has the first display listing priority, and if the client device is associated with the second geographic region identifier, then the particular one of the channels has the second display listing priority.

7. The method as recited in claim 6, wherein the first geographic region identifier identifies at least one of a country, a state, a county, a city, or a neighborhood.

8. The method as recited in claim 1, wherein the display listing priority is demographically dynamic, such that the display listing priority associated with the particular one of the channels may differ depending upon a demographic profile associated with the client device.

9. The method as recited in claim 8, wherein the display listing priority comprises:
a first display listing priority and an associated first demographic profile identifier; and
a second display listing priority and an associated second demographic profile identifier, such that if a subscriber profile associated with the client device comprises the first demographic profile identifier, then the particular one of the channels has the first display listing priority, and if the subscriber profile associated with the client device comprises the second demographic profile identifier, then the particular one of the channels has the second display listing priority.

10. The method as recited in claim 9, wherein the first demographic identifier identifies at least one of a gender, an age, a marital status, an income level, a dependent indicator, a dependent age, a hobby, a personal interest, a media program of interest, or a media channel of interest.

11. The method as recited in claim 1, further comprising associating the display listing priority with a particular day and time such that the channel, day, and time associated with the display listing priority corresponds to a scheduled broadcast of a particular program.

12. A media entertainment system configured to perform the method as recited in claim 1.

13. A method comprising:
receiving, by a client device, electronic program guide (EPG) data, the EPG data comprising:
programming data that identifies a plurality of channels over which media programs are scheduled for transmission over a network; and
a display listing priority associated with a particular one of the channels;
rendering, by the client device, the EPG data such that placement of the programming data associated with the particular one of the channels is based on the display listing priority;
gathering promoted listing tracking data based on at least one of:
rendering the programming data associated with the particular one of the channels based on the display listing priority; or
user selection of the programming data associated with the particular one of the channels in response to rendering the programming data associated with the particular one of the channels based on the display listing priority; and transmitting the promoted listing tracking data over a network.

14. The method as recited in claim 13, wherein the display listing priority is further associated with a particular day and time such that the channel, day, and time associated with the display listing priority corresponds to a particular scheduled broadcast of a particular media program.

15. The method as recited in claim 13, wherein the rendering comprises rendering the programming data associated with the particular one of the channels in a top line of an EPG grid.

16. The method as recited in claim 13, wherein the rendering comprises rendering the programming data associated with the particular one of the channels in a top line of a promoted listings area of an EPG display.

17. The method as recited in claim 13, wherein the display listing priority is geographically dynamic, and wherein the rendering comprises:
    identifying a geographic region associated with the client device;
    determining a specific display listing priority associated with the particular one of the channels based on the geographic region associated with the client device; and
    rendering the EPG data such that the placement of the programming data associated with the particular one of the channels is based on the specific display listing priority.

18. The method as recited in claim 13, wherein the display listing priority is geographically dynamic, such that the display listing priority comprises a first display listing priority with an associated first geographic region identifier and a second display listing priority with an associated second geographic region identifier, and wherein the rendering comprises:
    identifying a geographic region identifier associated with the client device;
    determining that the geographic region identifier associated with the client device differs from both the first and second geographic region identifiers that are associated with the first and second priorities; and
    rendering the EPG data such that the placement of the programming data associated with the particular one of the channels is not based on the display listing priority.

19. The method as recited in claim 13, wherein the display listing priority is demographically dynamic, and wherein the rendering comprises:
    identifying a subscriber profile associated with the client device;
    determining a specific display listing priority associated with the particular one of the channels based on the subscriber profile associated with the client device; and
    rendering the EPG data such that the placement of the programming data associated with the particular one of the channels is based on the specific display listing priority.

20. The method as recited in claim 13, wherein the display listing priority is demographically dynamic, such that the display listing priority comprises a first display listing priority with an associated first demographic identifier and a second display listing priority with an associated second demographic identifier, and wherein the rendering comprises:
    identifying a demographic identifier associated with the client device;
    determining that the demographic identifier associated with the client device differs from both the first and second demographic identifiers that are associated with the first and second priorities; and
    rendering the EPG data such that the placement of the programming data associated with the particular one of the channels is not based on the display listing priority.

21. A computing device configured to perform the method as recited in claim 13.

22. A computing device as recited in claim 21 comprising at least one of a television set-top box, a cable television receiver, a satellite television receiver, or a personal computer.

23. A system comprising:
    means for generating program data that represents a plurality of media programs scheduled for transmission over a plurality of channels, the program data further indicating a display listing priority associated with a particular one of the channels;
    means for transmitting the program data from a server to a client device such that the client device can generate a display of the program data, wherein the program data associated with the particular one of the channels is arranged based on the display listing priority; and
    means for receiving, from the client device, tracking data that indicates an effectiveness of the display listing priority.

24. The system as recited in claim 23, further comprising means for offering an ability to purchase a display listing priority to a content provider such that the content provider can purchase the display listing priority so that program data representing media content from the content provider can be displayed according to the display listing priority.

25. The system as recited in claim 23, embodied as a media entertainment server system.

26. A method comprising:
    receiving program data that indicates a plurality of media programs that are scheduled for transmission over a plurality of channels;
    identifying a particular one of the plurality of channels that is to be promoted;
    generating electronic program guide (EPG) data, the EPG data comprising:
        the program data; and
        priority data, which is generated by a server and offered to a content provider by the server, that indicates a display listing priority with which the particular one of the plurality of channels is to be promoted;
    transmitting the EPG data to a client device, the client device configured to generate a display of the program data based, at least in part, on the priority data;
    receiving, from the client device, promoted listing tracking data that indicates at least one of:
        how often a particular channel is promoted; or
        how often a particular channel is selected in response to being promoted.

27. A method as recited in claim 26, wherein the identifying further comprises identifying a particular day and time at which the particular one of the plurality of channels is to be promoted, such that the channel is to be promoted at a day and time that corresponds to a scheduled transmission of a particular media program.

28. A method as recited in claim 26, the operations further comprising associating a geographic region with the priority, indicating that the particular one of the plurality of channels is to be promoted within the geographic region.

29. A method as recited in claim 26, the operations further comprising associating a demographic attribute with the priority, indicating that the particular one of the plurality of channels is to be promoted to television viewers having the demographic attribute.

30. One or more non-volatile memory components encoded with computer-executable instructions that, when executed, direct a computing system to perform operations comprising:

receiving at a client device, electronic program guide (EPG) data that represents a plurality of media programs scheduled for transmission over a plurality of channels;

receiving priority data, which is generated by a server, that indicates a particular one of the channels that is to be promoted;

generating a display of the EPG data based, at least in part, on the priority data, such that a portion of the EPG data associated with the channel that is to be promoted is rendered in a more prominent area of the display than EPG data associated with another channel that is not being promoted; and tracking viewer selection of the channel in response to the channel being rendered in the more prominent area of the display.

31. One or more non-volatile memory components as recited in claim 30, wherein the priority data further indicates a time at which the particular one of the channels is to be promoted, the operations further comprising generating the display of the EPG data based, at least in part, on the priority data, such that the portion of the EPG data associated with the channel that is to be promoted is rendered in the prominent area of the display during the time at which the channel is to be promoted, and such that the portion of the EPG data associated with the channel that is to be promoted is rendered in a less prominent area of the display at a time other than the time indicated by the priority data.

32. One or more non-volatile memory components as recited in claim 30, wherein the priority data further indicates a geographic region within which the particular one of the channels is to be promoted, the operations further comprising:

determining a geographic region associated with the client device; and in an event that the geographic region associated with the client device is the same as the geographic region indicated by the priority data, generating the display of the EPG data based, at least in part, on the priority data, such that the portion of the EPG data associated with the channel that is to be promoted is rendered in the prominent area of the display.

33. One or more non-volatile memory components as recited in claim 30, wherein the priority data further indicates a demographic attribute of viewers to whom the particular one of the broadcast channels is to be promoted, the operations further comprising:

determining a demographic attribute associated with a viewer, the viewer being associated with the client device; and in an event that the demographic attribute associated with the viewer is the same as the demographic attribute indicated by the priority data, generating the display of the EPG data based, at least in part, on the priority data, such that the portion of the EPG data associated with the channel that is to be promoted is rendered in the more prominent area of the display.

* * * * *